US006867781B1

(12) United States Patent
Van Hook et al.

(10) Patent No.: US 6,867,781 B1
(45) Date of Patent: Mar. 15, 2005

(54) GRAPHICS PIPELINE TOKEN SYNCHRONIZATION

(75) Inventors: Timothy J. Van Hook, Atherton, CA (US); Farhad Fouladi, Los Altos Hills, CA (US); Robert Moore, Heathrow, FL (US); Howard H. Cheng, Sammamish, WA (US)

(73) Assignee: Nintendo Co., Ltd., Kyoto (JP)

( * ) Notice: Subject to any disclaimer, the term of this patent is extended or adjusted under 35 U.S.C. 154(b) by 418 days.

(21) Appl. No.: 09/722,419

(22) Filed: Nov. 28, 2000

Related U.S. Application Data

(60) Provisional application No. 60/226,889, filed on Aug. 23, 2000.

(51) Int. Cl.[7] .................................................. G06T 1/20

(52) U.S. Cl. ....................... 345/506; 345/522; 345/501; 345/502

(58) Field of Search ................................ 345/506, 522, 345/422, 501–505, 556; 712/40, 219

(56) References Cited

U.S. PATENT DOCUMENTS

| | | | |
|---|---|---|---|
| 4,275,413 | A | 6/1981 | Sakamoto et al. |
| 4,357,624 | A | 11/1982 | Greenberg |
| 4,388,620 | A | 6/1983 | Sherman |
| 4,425,559 | A | 1/1984 | Sherman |

(List continued on next page.)

FOREIGN PATENT DOCUMENTS

| | | |
|---|---|---|
| CA | 2070934 | 12/1993 |
| EP | 0 637 813 A2 | 2/1995 |
| EP | 1 074 945 | 2/2001 |
| EP | 1 075 146 | 2/2001 |

(List continued on next page.)

OTHER PUBLICATIONS

GDC 2000: Advanced OpenGL Game Development, "A Practical and Robust Bump–mapping Technique for Today's GPUs," by Mark Kilgard, Jul. 5, 2000, www.nvidia.com.

Technical Presentations: "Texture Space Bump Mapping," Sim Dietrich, Nov. 10, 2000, www.nvidia.com.

Whitepapers: "Texture Addressing," Sim Dietrich, Jan. 6, 2000, www.nvidia.com.

White paper, Huddy, Richard, "The Efficient Use of Vertex Buffers," (Nov. 1, 2000).

(List continued on next page.)

*Primary Examiner*—Matthew C. Bella
*Assistant Examiner*—Hau Nguyen
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. The graphics pipeline processes graphics commands at different rates depending upon the type of operation being performed. This makes it difficult to synchronize pipeline operations with external operations (e.g., a graphics processor with a main processor). To solve this problem, a synchronization token including a programmable data message is inserted into a graphics command stream sent to a graphics pipeline. At a predetermined point near the bottom of the pipeline, the token is captured and a signal is generated indicated the token has arrived. The graphics command producer can look at the captured token to determine which of multiple possible tokens has been captured, and can use the information to synchronize a task with the graphics pipeline. Applications include maintaining memory coherence in memory shared between the 3D graphics pipeline and a graphics command producer.

17 Claims, 8 Drawing Sheets

U.S. PATENT DOCUMENTS 4,463,380 A 7/1984 Hooks, Jr.
4,491,836 A 1/1985 Collmeyer et al.
4,570,233 A 2/1986 Yan et al.
4,586,038 A 4/1986 Sims et al.
4,600,919 A 7/1986 Stern
4,615,013 A 9/1986 Yan et al.
4,625,289 A 11/1986 Rockwood
4,653,012 A 3/1987 Duffy et al.
4,658,247 A 4/1987 Gharachorloo
4,692,880 A 9/1987 Merz et al.
4,695,943 A 9/1987 Keeley et al.
4,710,876 A 12/1987 Cline et al.
4,725,831 A 2/1988 Coleman
4,768,148 A 8/1988 Keeley et al.
4,785,395 A 11/1988 Keeley
4,790,025 A 12/1988 Inoue et al.
4,808,988 A 2/1989 Burke et al.
4,812,988 A 3/1989 Duthuit et al.
4,817,175 A 3/1989 Tenenbaum et al.
4,829,295 A 5/1989 Hiroyuki
4,829,452 A 5/1989 Kang et al.
4,833,601 A 5/1989 Barlow et al.
4,855,934 A 8/1989 Robinson
4,862,392 A 8/1989 Steiner
4,866,637 A 9/1989 Gonzalez-Lopez et al.
4,888,712 A 12/1989 Barkans et al.
4,897,806 A 1/1990 Cook et al.
4,901,064 A 2/1990 Deering
4,907,174 A 3/1990 Priem
4,914,729 A 4/1990 Omori et al.
4,918,625 A 4/1990 Yan
4,935,879 A 6/1990 Ueda
4,945,500 A 7/1990 Deering
4,965,751 A 10/1990 Thayer et al.
4,974,176 A 11/1990 Buchner et al.
4,974,177 A 11/1990 Nishiguchi
4,975,977 A 12/1990 Kurosu et al.
4,989,138 A 1/1991 Radochonski
5,003,496 A 3/1991 Hunt, Jr. et al.
5,016,183 A 5/1991 Shyong
5,018,076 A 5/1991 Johary et al.
5,043,922 A 8/1991 Matsumoto
5,056,044 A 10/1991 Frederickson et al.
5,062,057 A 10/1991 Blacken et al.
5,086,495 A 2/1992 Gray et al.
5,091,967 A 2/1992 Ohsawa
5,097,427 A 3/1992 Lathrop et al.
5,136,664 A 8/1992 Bersack et al.
5,144,291 A 9/1992 Nishizawa
5,163,126 A 11/1992 Einkauf et al.
5,170,468 A 12/1992 Shah et al.
5,179,638 A 1/1993 Dawson et al.
5,204,944 A 4/1993 Wolberg et al.
5,224,208 A 6/1993 Miller, Jr. et al.
5,239,624 A 8/1993 Cook et al.
5,241,658 A 8/1993 Masterson et al.
5,255,353 A 10/1993 Itoh
5,268,995 A 12/1993 Diefendorff et al.
5,268,996 A 12/1993 Steiner et al.
5,278,948 A 1/1994 Luken, Jr.
5,307,450 A 4/1994 Grossman
5,315,692 A 5/1994 Hansen et al.
5,345,541 A 9/1994 Kelley et al.
5,353,424 A 10/1994 Partovi et al.
5,357,579 A 10/1994 Buchner et al.
5,361,386 A 11/1994 Watkins et al.
5,363,475 A 11/1994 Baker et al.
5,377,313 A 12/1994 Scheibl
5,392,385 A 2/1995 Evangelisti et al.
5,392,393 A 2/1995 Deering
5,394,516 A 2/1995 Winser
5,402,532 A 3/1995 Epstein et al.
5,404,445 A 4/1995 Matsumoto
5,408,650 A 4/1995 Arsenault
5,412,796 A 5/1995 Olive
5,415,549 A 5/1995 Logg
5,416,606 A 5/1995 Katayama et al.
5,421,028 A 5/1995 Swanson
5,422,997 A 6/1995 Nagashima
5,432,895 A 7/1995 Myers
5,432,900 A 7/1995 Rhodes et al.
5,438,663 A 8/1995 Matsumoto et al.
5,448,689 A 9/1995 Matsuo et al.
5,457,775 A 10/1995 Johnson, Jr. et al.
5,461,712 A 10/1995 Chelstowski et al.
5,467,438 A 11/1995 Nishio et al.
5,467,459 A 11/1995 Alexander et al.
5,469,535 A 11/1995 Jarvis et al.
5,473,736 A 12/1995 Young
5,475,803 A 12/1995 Stearns et al.
5,487,146 A 1/1996 Guttag et al.
5,490,240 A 2/1996 Foran et al.
5,495,563 A 2/1996 Winser
5,504,499 A 4/1996 Horie et al.
5,504,917 A 4/1996 Austin
5,506,604 A 4/1996 Nally et al.
5,535,374 A 7/1996 Olive
5,543,824 A 8/1996 Priem et al.
5,544,292 A 8/1996 Winser
5,548,709 A 8/1996 Hannah et al.
5,553,228 A 9/1996 Erb et al.
5,557,712 A 9/1996 Guay
5,559,954 A 9/1996 Sakoda et al.
5,561,746 A 10/1996 Murata et al.
5,561,752 A 10/1996 Jevans
5,563,989 A 10/1996 Billyard
5,566,285 A 10/1996 Okada
5,573,402 A 11/1996 Gray
5,579,456 A 11/1996 Cosman
5,582,451 A 12/1996 Baumann
5,586,234 A 12/1996 Sakuraba et al.
5,593,350 A 1/1997 Bouton et al.
5,594,854 A 1/1997 Baldwin et al.
5,600,763 A 2/1997 Greene et al.
5,606,650 A 2/1997 Kelley et al.
5,607,157 A 3/1997 Nagashima
5,608,424 A 3/1997 Takahashi et al.
5,608,864 A 3/1997 Bindlish et al.
5,616,031 A 4/1997 Logg
5,621,867 A 4/1997 Murata et al.
5,628,686 A 5/1997 Svancarek et al.
5,638,535 A 6/1997 Rosenthal et al.
5,644,364 A 7/1997 Kurtze et al.
5,649,082 A 7/1997 Burns
5,650,955 A 7/1997 Puar et al.
5,651,104 A 7/1997 Cosman
5,657,045 A 8/1997 Katsura et al.
5,657,443 A 8/1997 Krech, Jr.
5,657,478 A 8/1997 Recker et al.
5,659,671 A 8/1997 Tannenbaum et al.
5,659,673 A 8/1997 Nonoshita
5,659,715 A 8/1997 Wu et al.
5,664,162 A 9/1997 Dye
5,666,439 A 9/1997 Ishida et al.
5,678,037 A 10/1997 Osugi et al.
5,682,522 A 10/1997 Huang et al.
5,684,941 A 11/1997 Dye
5,687,304 A 11/1997 Kiss
5,687,357 A 11/1997 Priem
5,691,746 A 11/1997 Shyu 5,694,143 A 12/1997 Fielder et al.
5,696,892 A 12/1997 Redmann et al.
5,701,444 A 12/1997 Baldwin
5,703,806 A 12/1997 Puar et al.
5,706,481 A 1/1998 Hannah et al.
5,706,482 A 1/1998 Matsushima et al.
5,714,981 A 2/1998 Scott-Jackson et al.
5,721,947 A 2/1998 Priem et al.
5,724,561 A 3/1998 Tarolli et al.
5,726,689 A 3/1998 Negishi et al.
5,726,947 A 3/1998 Yamazaki et al.
5,727,192 A 3/1998 Baldwin
5,734,386 A 3/1998 Cosman
5,739,819 A 4/1998 Bar-Nahum
5,740,343 A 4/1998 Tarolli et al.
5,740,383 A 4/1998 Nally et al.
5,740,406 A 4/1998 Rosenthal et al.
5,742,749 A 4/1998 Foran et al.
5,742,788 A 4/1998 Priem et al.
5,745,118 A 4/1998 Alcorn et al.
5,745,125 A 4/1998 Deering et al.
5,748,199 A 5/1998 Palm
5,748,986 A 5/1998 Butterfield et al.
5,751,291 A 5/1998 Olsen et al.
5,751,292 A 5/1998 Emmot
5,751,295 A 5/1998 Becklund et al.
5,751,930 A 5/1998 Katsura et al.
5,754,191 A 5/1998 Mills et al.
5,757,382 A 5/1998 Lee
5,758,182 A 5/1998 Rosenthal et al.
5,760,783 A 6/1998 Migdal et al.
5,764,228 A 6/1998 Baldwin
5,764,237 A 6/1998 Kaneko
5,764,243 A 6/1998 Baldwin
5,767,856 A 6/1998 Peterson et al.
5,767,858 A 6/1998 Kawase et al.
5,768,626 A 6/1998 Munson et al.
5,768,629 A * 6/1998 Wise et al.
5,774,133 A 6/1998 Neave et al.
5,777,623 A 7/1998 Small
5,777,629 A 7/1998 Baldwin
5,781,927 A 7/1998 Wu et al.
5,791,994 A 8/1998 Hirano et al.
5,798,770 A 8/1998 Baldwin
5,801,706 A 9/1998 Fujita et al.
5,801,711 A 9/1998 Koss et al.
5,801,716 A 9/1998 Silverbrook
5,801,720 A 9/1998 Norrod et al.
5,805,175 A 9/1998 Priem
5,805,868 A 9/1998 Murphy
5,808,619 A 9/1998 Choi et al.
5,808,630 A 9/1998 Pannell
5,809,219 A 9/1998 Pearce et al.
5,809,278 A 9/1998 Watanabe et al.
5,815,165 A 9/1998 Blixt
5,815,166 A 9/1998 Baldwin
5,818,456 A 10/1998 Cosman et al.
5,819,017 A 10/1998 Akeley et al.
5,821,940 A 10/1998 Morgan et al.
5,821,949 A 10/1998 Deering
5,822,516 A 10/1998 Krech, Jr.
5,828,382 A 10/1998 Wilde
5,828,383 A 10/1998 May et al.
5,828,907 A 10/1998 Wise et al.
5,831,624 A 11/1998 Tarolli et al.
5,831,625 A 11/1998 Rich et al.
5,831,640 A 11/1998 Wang et al.
5,835,096 A 11/1998 Baldwin
5,835,792 A 11/1998 Wise et al.
5,838,334 A 11/1998 Dye
5,844,576 A 12/1998 Wilde et al.
5,850,229 A 12/1998 Edelsbrunner et al.
5,856,829 A 1/1999 Gray, III et al.
5,859,645 A 1/1999 Latham
5,861,888 A 1/1999 Dempsey
5,861,893 A 1/1999 Sturgess
5,867,166 A 2/1999 Myhrvold et al.
5,870,097 A 2/1999 Snyder et al.
5,870,098 A 2/1999 Gardiner
5,870,102 A 2/1999 Tarolli et al.
5,870,109 A 2/1999 McCormack et al.
5,870,587 A 2/1999 Danforth et al.
5,872,902 A 2/1999 Kuchkuda et al.
5,874,969 A 2/1999 Storm et al.
5,877,741 A 3/1999 Chee et al.
5,877,770 A 3/1999 Hanaoka
5,877,771 A 3/1999 Drebin et al.
5,880,736 A 3/1999 Peercy et al.
5,880,737 A 3/1999 Griffin et al.
5,883,638 A 3/1999 Rouet et al.
5,886,701 A 3/1999 Chauvin et al.
5,886,705 A 3/1999 Lentz
5,887,155 A 3/1999 Laidig
5,890,190 A 3/1999 Rutman
5,892,517 A 4/1999 Rich
5,892,974 A 4/1999 Koizumi et al.
5,894,300 A 4/1999 Takizawa
5,900,881 A 5/1999 Ikedo
5,903,283 A 5/1999 Selwan et al.
5,909,218 A 6/1999 Naka et al.
5,909,225 A 6/1999 Schinnerer et al.
5,912,675 A 6/1999 Laperriere
5,912,676 A 6/1999 Malladi et al.
5,914,721 A 6/1999 Lim
5,914,725 A 6/1999 MacInnis et al.
5,914,729 A 6/1999 Lippincott
5,917,496 A 6/1999 Fujita et al.
5,920,326 A 7/1999 Rentschler et al.
5,920,876 A 7/1999 Ungar et al.
5,923,332 A 7/1999 Izawa
5,923,334 A 7/1999 Luken
5,926,182 A 7/1999 Menon et al.
5,926,647 A 7/1999 Adams et al.
5,933,150 A 8/1999 Ngo et al.
5,933,154 A 8/1999 Howard et al.
5,933,155 A 8/1999 Akeley
5,933,529 A 8/1999 Kim
5,936,641 A 8/1999 Jain et al.
5,936,683 A 8/1999 Lin
5,940,086 A 8/1999 Rentschler et al.
5,940,089 A 8/1999 Dilliplane et al.
5,940,538 A 8/1999 Spiegel et al.
5,943,058 A 8/1999 Nagy
5,943,060 A 8/1999 Cosman et al.
5,945,997 A 8/1999 Zhao et al.
5,949,421 A 9/1999 Ogletree et al.
5,949,423 A 9/1999 Olsen
5,949,424 A 9/1999 Cabral et al.
5,949,428 A 9/1999 Toelle et al.
5,949,440 A 9/1999 Krech, Jr. et al.
5,956,042 A 9/1999 Tucker et al.
5,956,043 A 9/1999 Jensen
5,958,020 A 9/1999 Evoy et al.
5,959,640 A 9/1999 Rudin et al.
5,963,220 A 10/1999 Lee et al.
5,966,134 A 10/1999 Arias
5,969,726 A 10/1999 Rentschler et al.
5,977,979 A 11/1999 Clough et al.
5,977,984 A 11/1999 Omori
5,982,376 A 11/1999 Abe et al.
5,982,390 A 11/1999 Stoneking et al.
5,986,659 A 11/1999 Gallery et al.

5,986,663 A 11/1999 Wilde
5,986,677 A 11/1999 Jones et al.
5,987,567 A 11/1999 Rivard et al.
5,990,903 A 11/1999 Donovan
5,995,120 A 11/1999 Dye
5,995,121 A 11/1999 Alcokrn et al.
5,999,189 A 12/1999 Kajiya et al.
5,999,196 A 12/1999 Storm et al.
5,999,198 A 12/1999 Horan et al.
6,002,407 A 12/1999 Fadden
6,002,409 A 12/1999 Harkin
6,002,410 A 12/1999 Battle
6,005,582 A 12/1999 Gabriel et al.
6,005,583 A 12/1999 Morrison
6,005,584 A 12/1999 Kitamura et al.
6,007,428 A 12/1999 Nishiumi et al.
6,008,820 A 12/1999 Chauvin et al.
6,011,562 A 1/2000 Gagne et al.
6,011,565 A 1/2000 Kuo et al.
6,014,144 A 1/2000 Nelson et al.
6,016,150 A 1/2000 Lengyel et al.
6,016,151 A 1/2000 Lin
6,018,350 A 1/2000 Lee et al.
6,020,931 A 2/2000 Bilbrey et al.
6,021,417 A 2/2000 Massarksy
6,022,274 A 2/2000 Takeda et al.
6,023,261 A 2/2000 Ugajin
6,023,738 A 2/2000 Priem et al.
6,025,853 A 2/2000 Baldwin
6,026,182 A 2/2000 Lee et al.
6,028,608 A 2/2000 Jenkins
6,028,611 A 2/2000 Anderson et al.
6,031,542 A 2/2000 Wittig
6,035,360 A 3/2000 Doidge et al.
6,037,948 A 3/2000 Liepa
6,037,949 A 3/2000 DeRose et al.
6,038,031 A 3/2000 Murphy
6,038,348 A 3/2000 Carley
6,040,843 A 3/2000 Monroe et al.
6,040,844 A 3/2000 Yamaguchi et al.
6,041,010 A 3/2000 Puar et al.
6,043,804 A 3/2000 Greene
6,043,821 A 3/2000 Sprague et al.
6,046,746 A 4/2000 Deering
6,046,747 A 4/2000 Saunders et al.
6,046,752 A 4/2000 Kirkland et al.
6,049,337 A 4/2000 Van Overveld
6,049,338 A 4/2000 Anderson et al.
6,052,125 A 4/2000 Gardiner et al.
6,052,126 A 4/2000 Sakuraba et al.
6,052,127 A 4/2000 Vaswani et al.
6,052,129 A 4/2000 Fowler et al.
6,052,133 A 4/2000 Kang
6,054,993 A 4/2000 Devic et al.
6,054,999 A 4/2000 Strandberg
6,057,847 A 5/2000 Jenkins
6,057,849 A 5/2000 Haubner et al.
6,057,851 A 5/2000 Luken et al.
6,057,852 A 5/2000 Krech, Jr.
6,057,859 A 5/2000 Handelman et al.
6,057,861 A 5/2000 Lee et al.
6,057,862 A 5/2000 Margulis
6,057,863 A 5/2000 Olarig
6,061,462 A 5/2000 Tostevin et al.
6,064,392 A 5/2000 Rohner
6,067,098 A 5/2000 Dye
6,070,204 A 5/2000 Poisner
6,072,496 A 6/2000 Guenter et al.
6,075,543 A 6/2000 Akeley
6,075,546 A 6/2000 Hussain et al.
6,078,311 A 6/2000 Pelkey
6,078,333 A 6/2000 Wittig et al.
6,078,334 A 6/2000 Hanaoka et al.
6,078,338 A 6/2000 Horan et al.
6,081,274 A 6/2000 Shiraishi
6,088,035 A 7/2000 Sudarsky et al.
6,088,042 A 7/2000 Handelman et al.
6,088,487 A 7/2000 Kurashige
6,088,701 A 7/2000 Whaley et al.
6,091,431 A 7/2000 Saxena et al.
6,092,124 A 7/2000 Priem et al.
6,092,158 A 7/2000 Harriman et al.
6,094,200 A 7/2000 Olsen et al.
6,097,435 A 8/2000 Stanger et al.
6,097,437 A 8/2000 Hwang
6,104,415 A * 8/2000 Gossett ........................ 345/552
6,104,417 A 8/2000 Nielsen et al.
6,105,094 A 8/2000 Lindeman
6,108,743 A 8/2000 Debs et al.
6,111,582 A 8/2000 Jenkins
6,111,584 A 8/2000 Murphy
6,115,047 A 9/2000 Deering
6,115,049 A 9/2000 Winner et al.
6,118,462 A 9/2000 Margulis
6,128,026 A 10/2000 Brothers, III
6,144,365 A 11/2000 Young et al.
6,144,387 A 11/2000 Liu et al.
6,151,602 A 11/2000 Hejlsberg et al.
6,155,926 A 12/2000 Miyamoto et al.
6,157,387 A 12/2000 Kotani
6,166,748 A 12/2000 Van Hook et al.
6,172,678 B1 1/2001 Shiraishi
6,173,367 B1 1/2001 Aleksic et al.
6,177,944 B1 1/2001 Fowler et al.
6,181,352 B1 1/2001 Kirk et al.
6,191,794 B1 2/2001 Priem et al.
6,198,488 B1 3/2001 Lindholm et al.
6,200,253 B1 3/2001 Nishiumi et al.
6,204,851 B1 3/2001 Netschke et al.
6,215,496 B1 4/2001 Szeliski et al.
6,215,497 B1 4/2001 Leung
6,226,012 B1 5/2001 Priem et al.
6,226,713 B1 5/2001 Mehrotra
6,232,981 B1 5/2001 Gossett
6,236,413 B1 5/2001 Gossett et al.
6,239,810 B1 5/2001 Van Hook et al.
6,252,608 B1 6/2001 Snyder et al.
6,252,610 B1 * 6/2001 Hussain
6,264,558 B1 7/2001 Nishiumi et al.
6,268,861 B1 7/2001 Sanz-Pastor et al.
6,275,235 B1 8/2001 Morgan, III
6,285,779 B1 9/2001 Lapidous et al.
6,292,194 B1 9/2001 Powell, III
6,329,996 B1 * 12/2001 Bowen et al. .............. 345/506
6,329,997 B1 12/2001 Wu et al.
6,331,856 B1 12/2001 Van Hook et al.
6,339,428 B1 1/2002 Fowler et al.
6,342,892 B1 1/2002 Van Hook et al.
6,353,438 B1 3/2002 Van Hook
6,356,497 B1 3/2002 Puar et al.
6,408,362 B1 6/2002 Arimilli et al.
6,417,858 B1 7/2002 Bosch et al.
6,426,747 B1 7/2002 Hoppe et al.
6,437,781 B1 8/2002 Tucker et al.
6,459,429 B1 10/2002 Deering
6,466,223 B1 10/2002 Dorbie et al.
6,469,707 B1 10/2002 Voorhies
6,476,808 B1 * 11/2002 Kuo et al.
6,476,822 B1 11/2002 Burbank
6,496,187 B1 12/2002 Deering et al.

FOREIGN PATENT DOCUMENTS

| | | |
|---|---|---|
| EP | 1 081 649 | 3/2001 |
| JP | 9-330230 | 12/1997 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO/93/04429 | 3/1993 |
| WO | WO 94/10641 | 5/1994 |

OTHER PUBLICATIONS

White paper, Spitzer, John, et al., "Using GL_NV_array_ range and GL_NV_Fence on GEForce Products and Beyond" (Aug. 1, 2000).

White paper, Rogers, Douglas H., "Optimizing Direct3D for the GEForce 256" (Jan. 3, 2000).

Hook, Brian, "An Imcomplete Guide to Programming DirectDraw and Direct 3D Immediate Mode (Release 0.46)," printed from web site: www.wksoftware.com, 42 pages.

Thompson, Tom, "Must–See 3–D Engines," Byte Magazine, printed from web site www.byte.com, 10 pages (Jun. 1996).

Thompson, Nigel, "Rendering with Immediate Mode," Microsoft Interactive Developer Column: Fun and Games, printed from web site msdn.microsoft.com, 8 pages (Mar. 1997).

"HOWTO: Animate Textures in Direct3D Immediate Mode," printed from web site support.microsoft.com, 3 pages (last reviewed Dec. 15, 2000).

INFO: Rendering a Triangle Using an Execute Buffer, printed from web site support.microsoft.com, 6 pages (last reviewed Oct. 20, 2000).

U.S. Appl. No. 09/337,293, filed Jun. 21, 1999, Multi–Format Vertex Data Processing Apparatus and Method [issued as U.S. patent No. 6,501,479 B1 on Dec. 31, 2002].

Datasheet, SGS–Thomson Microelectronics, nVIDIA™, RIVA 128™ 128–Bit 3D Multimedia Accelerator (Oct. 1997).

Product Presentation, "RIVA128™ Leadership 3D Acceleration," 2 pages.

ZDNET Reviews, from PC Magazine, "Other Enhancements," Jan. 15, 1999, wysiwyg://11/http://www4.zdnet.com...ies/reviews/0,4161,2188286.00.html.

ZDNet Reviews, from PC Magazine, "Screen Shot of Alpha–channel Transparency," Jan. 15, 1999, wysiwyg://16/http://www4.zdnet.com...ies/reviews/0.4161, 2188286.00.html.

Alpha (transparency) Effects, Future Technology Research Index, http://www.futuretech.vuurwerk.n1/alpha.html.

Blythe, David, 5.6 Transparency Mapping and Trimming with Alpha, http://toolbox.sgi.com/TasteOfDT/d...penGL/advanced98/notes/node41.html, Jun. 11, 1998.

10.2 Alpha Blending, http://www.sgi.com/software.opengl/advanced98/notes/node146.html.

10.3 Sorting, http://www.sgi.com/software/opengl/advanced98/notes/node147.html.

10.4 Using the Alpha Function, http://www.sgi.com/software/opengl/advanced98/notes/node148.html.

Winner, Stephanie, et al., "Hardware Accelerated Rendering Of Antialiasing Using A Modified A–buffer Algorithm," Computer Graphics Proceedings, Annual Conference Series, 1997, pp 307–316.

Debevec, Paul, et al., "Efficient View–Dependent Image–Based Rendering with Projective Texture–Mapping," University of California at Berkeley.

Gibson, Simon, et al., "Interactive Rendering with Real–World Illumination," Rendering Techniques 2000; 11th Eurographics Workshop on Rendering, pp. 365–376 (Jun. 2000).

Segal, Mark, et al., "Fast Shadows and Lighting Effects Using Texture Mapping," Computer Graphics, 26, 2, pp.. 249–252 (Jul. 1992).

White paper, Kilgard, Mark J., "Improving Shadows and Reflections via the Stencil Buffer" (Nov. 3, 1999).

"OpenGL Projected Textures," from web site:HTTP:// reality.sgi.com, 5 pages.

"5.13.1 How to Project a Texture," from web site: www.sgi.com, 2 pages.

Arkin, Alan, email, subject: "Texture distortion problem," from web site: HTTP://reality.sig.com (Jul. 1997).

Moller, Tomas et al., "Real–Time Rendering," pp. 179–183 (AK Peters Ltd., 1999).

Williams, Lance, "Casting Curved Shadows on Curved Surfaces," Computer Graphics (SIGGRAPH '78 Proceedings), vol. 12, No. 3, pp. 270–274 (Aug. 1978).

Woo et al., "A Survey of Shadow Algorithms," IEEE Computer Graphics and Applications, vol. 10, No. 6, pp. 13–32 (Nov. 1990).

Heidrich et al., "Applications of Pixel Textures in Visualization and Realistic Image Synthesis," Proceedings 1999 Symposium On Interactive 3D Graphics, pp. 127–134 (Apr. 1999).

Hourcade et al., "Algorithms for Antiliased Cast Shadows", Computers and Graphics, vol. 9, No. 3, pp. 260–265 (1985).

Michael McCool, "Shadow Volume Reconstruction from Depth Maps", ACM Transactions on Graphics, vol. 19, No. 1, Jan. 2000, pp. 1–26.

RenderMan Artist Tools, PhotoRealistic RenderMan 3.8 User's Manual, Pixar (Aug. 1998).

RenderMan Interface Version 3.2 (Jul. 2000).

White Paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).

Peter J. Kovach, Inside Direct 3D, "Alpha Testing," ppp 289–291 (1999).

Web site information, CartoonReyes, REM Infografica, http://www.digimotion.co.uk/cartoonreyes.htm.

Raskar, Ramesh et al., "Image Precision Silhouette Edges," Symposium on Interactive 3D Graphics 1999, Atlanta, 7 pages (Apr. 26–29, 1999).

Schlechtwegm Stefan et al., Rendering Line–Drawings with Limited Resources, Proceedings of GRAPHICON '96, 6th International Conference and Exhibition on Computer Graphics and Visualization in Russia, (St. Petersburg, Jul. 1–5, 1996) vol. 2, pp 131–137.
Haeberli, Paul et al., "Texture Mapping as a Fundamental Drawing Primitive," Proceedings of the Fourth Eurographics Workshop on Rendering, 11pages, Paris, France (Jun. 1993).
Schlechtweg, Stefan et al., "Empphasising in Line–drawings," Norsk samarbeid innen grafisk databehandling: NORSIGD Info, medlemsblad for NORSIGD, Nr 1/95, pp. 9–10.
Markosian, Lee et al., "Real–Time Nonphotorealistic Rendering," Brown University site of the NSF Science and Technology Center for Computer Graphics and Scientific Visualization, Providence, RI, 5 pages (undated).
Feth, Bill, "Non–Photorealistic Rendering," wif3@cornell.edu, CS490—Bruce Land, 5 pages (Spring 1998).
Elber, Gershon, "Line Art Illustrations of Parametric and Implicit Forms," IEEE Transactions on Visualization and Computer Graphics, vol. 4, No. 1, Jan.–Mar. 1998.
Zeleznik, Robert et al. "SKETCH: An Interface for Sketching 3D Scenes," Computer Graphics Proceedings, Annual Conference Series 1996, pp. 163–170.
Computer Graphics World, Dec. 1997.
Reynolds, Craig, "Stylized Depiction in Computer Graphics, Non–Photorealistic, Painterly and Toon Rendering," an annotated survey of online resources, 13 pages, last update May 30, 2000, http://www.red.com/cwr/painterly.html.
Render Man Artist Tools, Using Arbitrary Output Variables in Photorealistic Renderman (With Applications), PhotoRealistic Renderman Application Note #24, 8 pages, Jun. 1998, http://www.pixar.com/.products/renderman/toolkit/Toolkit/AppNotes/appnote.24.html.
Decaudin, Philippe, "Cartoon–Looking Rendering of 3D Scenes," Syntim Project Inria, 6 pages, http://www–syntim.inria.fr/syntim/recherche/decaudin/cartoon–eng.html.
Hachigan, Jennifer, "Super Cel Shader 1.00 Tips and Tricks," 2 pages, wysiwyg://thePage.13/http://members.xoom.com/__XMCM.jarvia/3D/celshade.html.
Digimation Inc., "The Incredible Comicshop," info sheet, 2 pages, http://www.digimation.com/asp/product/asp?product__id=33.
Softimage/3D Full Support, "Toon Assistant," 1998 Avid Technology, Inc., 1 page, http://www.softimage.com/3dsupport/techn...uments/3.8/features3.8/rel__notes.56.html.
Cambridge Animo—Scene III, info sheet, Cambridge Animation Systems, 2 pages, http://www.cam–ani.co.uk/casweb/products/software/Scenelll.htm.
Mulligan, Vikram, Toon, info sheet, 2 pages, http://digitalcarversguild.com/products/toon/toon.thml.
Toony Shaders, "Dang I'm tired of photorealism," 4 pages, http://www.visi.com/~mcdonald/toony.html.
"Cartoon Shading, Using Shading Mapping," 1 page, http://www.goat.com/alias/shaders.html#toonshad .
Web site information, CartoonReyes, http://www.zentertainment.com/zentropy/review/cartoonreyes.html.
VIDI Presenter 3D Repository, "Shaders." 2 pages, http://www.webnation.com/vidirep/panels/renderman/shaders/toon.phtml.
The RenderMan Interface Version 3.1, (Sep. 1989).
"Renderman Artist Tools, PhotoRealistic RenderMan Tutorial," Pixar (Jan. 1996).
Web site materials, "Renderman Artist Tools, PhotoRealistic RenderMan 3.8 User's Manual," Pixar.
NVIDIA.com, technical presentation, "AGDC Per–Pixel Shading" (Nov. 15, 2000).
NVIDIA.com, technical presentation, Introduction to DX8 Pixel Shaders (Nov. 10, 2000).
NVIDIA.com, technical presentation, "Advanced Pixel Shader Details" (Nov. 10, 2000).
"Developer's Lair, Multitexturing with the ATI Rage Pro," (7 pages) from ati.com web site (2000).
Slide Presentation, Sébastien Dominé, "nVIDIA Mesh Skinning, OpenGl".
Singh, Karan et al., "Skinning Characters using Surface–Oriented Free–Form Deformations," Toronto Canada.
"Hardware Technology," from ATI.com web site, 8 pages (2000).
"Skeletal Animation and Skinning," from ATI.com web site, 2 pages (Summer 2000).
"Developer Relations, ATI Summer 2000 Developer Newsletter," from ATI.com web site, 5 pages (Summer 2000).
Press Releases, "ATI's RADEON family of products delivers the most comprehensive support for the advance graphics features of DirectX 8.0," Canada, from ATI.com web site, 2 pages (Nov. 9, 2000).
"ATI RADEON Skinning and Tweening," from ATI.com web site, 1 page (2000).
Hart, Evan et al., "Vertex Shading with Direct3D and OpenGL," Game Developers Conference 2001, from ATI.com web site (2001).
Search Results for: skinning, from ATI.com web site, 5 pages (May 24, 2001).
Hart, Evan et al., "Graphics by rage," Game Developers Conference 2000, from ATI.com web site (2000).
Efficient Command/Data Interface Protocol For Graphics, IBM TDB, vol. 36, issue 9A, Sep. 1, 1993, pp. 307–312.
Shade, Jonathan et al., "Layered Depth Images," Computer Graphics Proceedings, Annnual Conference Series, pp. 231–242 (1998).
Videum Conference Pro (PCI) Specification, product of Winnov (Winnov), published Jul. 21, 1999.
Hoppe, Hugues, "Optimization of Mesh Locality for Transparent Vertex Caching," Proceedings of SIGGRAPH, pp. 269–276 (Aug. 8–13, 1999).
Whitepaper: Implementing Fog in Direct3D, Jan. 3, 2000, www.nvidia.com.
Akeley, Kurt, "Reality Engine Graphics", 1993, Silicon Graphics Computer Systems, pp. 109–116.
Photograph of Sony PlayStation II System.
Photograph of Sega Dreamcast System.
Photograph of Nintendo 64 System.
Whitepaper: 3D Graphics Demystified, Nov. 11, 1999, www.nvidia.com.
Whitepaper: "Z Buffering, Interpolation and More W–Buffering", Doug Rogers, Jan. 31, 2000, www.nvidia.com.
Whitepaper: Using GL__NV__vertex__array and GL__NV__fence, posted Aug. 1, 2000, www.nvidia.com.
Whitepaper: Anistropic Texture Filtering in OpenGL. posted Jul. 17, 2000, www.nvidia.com.
Whitepaper: Mapping Texels to Pixels in D3D, posted Apr. 5, 2000, www.nvidia.com.
Whitepaper: Guard Band Clipping, posted Jan. 31, 2000, www.nvidia.com.

Whitepaper: Cube Environment Mapping, posted Jan. 14, 2000, www.nvidia.com.
Whitepaper: Color Key in D3D, posted Jan. 11, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lighting, Nov. 10, 1999, www.nvidia.com.
Technical Brief: What's New With Microsoft DirectX7, posted Nov. 10, 1999, www.nvidia.com.
Mitchell et al., "Multitexturing in DirectX6", Game Developer, Sep. 1998, www.gdmag.com.
Vision Tek, "GeForce2 GS Graphics Processing Unit", © 2000 www.visiontek.com.
Jim Bushnell et al. "Advanced Multitexture Effects With Direct 3D and OpenGL", Pyramid Peak Design & ATI Research, Inc., GameDevelopers Conference, © 1999.
Sony PlayStation II Instruction Manual, Sony Computer Entertainment Inc., © 2000.
Stand and Be Judged, Next Generation, May 2000.
PlayStation II: Hardware Heaven or Hell?, Next Generation, Jan. 2000.
Chris Charla, "PlayStation II: The Latest News", Next Generation, Sep. 1999.
"First PlayStation II Gameplay Screens Revealed!", Next Generation, Sep. 1999.
Game Enthusiast Online Highlights, Mar. 18, 1999.
Game Enthusiast Online Highlights, Mar. 19, 1999.
Game Enthusiast Online Highlights, Mar. 17, 1999.
Game Enthusiast Online Highlights, Oct. 20, 1999.
Joel Easley, "Playstation II Revealed", Game Week, Sep. 29, 1999.
Inside Sony's Next Generation Playstation, © 1999.
Press Releases, Mar. 18, 1999.
Chris Johnston, "PlayStation Part Deux", Press Start, © 1999.
Nikkei Shimbun, "Sony Making SME, Chemical and SPT into Wholly–Owned Subsidiaries", Mar. 9, 1999.
AM News: Japanese Developers Not All Sold on PS2, Next Generation, Mar. 16, 1999.
Sony To Turn PlayStation Maker into Wholly Owned Unit–Nikkei, Dow Jones News Service, Mar. 8, 1999.
Yumiko Ono, Sony Antes Up Its Chips In Bet On New Game System, Dow Jones News Service, Mar. 4, 1999.
MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.
A Microprocessor With a 128b CPU, 10 Floating–Point MAC's, 4 Floating–Point Dividers, and an MPEG2 Decoder, 1999 IEEE International Solid–State Circuits Conference, Feb. 16, 1999.
Dreamcast Instruction Manuel, Sega Enterprises, Ltd., © 1998.
"Sega To Launch Video Camera for Dreamcast", Reuters Business News, Feb. 16, 2000.
David Pescovitz, "Dream On", Wired, Aug. 1999.
Randy Nelson, "Dreamcast 101: Everything You Ever Wanted To Know About Sega's Powerful New Console", Official Sega Dreamcast Magazine, Jun. 1999.
2D/3D Graphics Card User Manual, Guillemot © 1999.
Nintendo 64 Instruction Booklet, Nintendo of America, 1998.
Steven Levy, "Here Comes PlayStation II", Newsweek, Mar. 6, 2000.
David Sheff, "Sony Smackage: Test Driving The PlayStation II", Wired, Nov. 1999.
Introducing The Next Generation PlayStation, Sony Computer Entertainment Inc., © 1999.
Leadtek GTS, Aug. 3, 2000, www.hexus.net.
Voodoo 5 5500 Review, Jul. 26, 2000, www.hexus.net.
ATI Radeon 64 Meg DDR OEM, Aug., 19, 2000, www.hexus.net.
Microsoft Xbox—The Future of Gaming, Microsoft Xbox Performance Sheet, www.xbox.com.
Robert L. Cook, "Shade Trees", Computer Graphics, vol. 18, No. 3, Jul. 1984.
Wang et al., "Second–Depth Shadow Mapping", Department of Computer Science, Univ. N.C. Chapel Hill, N.C. pp. 1–7.
Peercy et al., "Efficient Bump Mapping Hardware", Computer Graphics Proceedings, Annual Conference Series, 1997.
Gustavo Oliveira, "Refractive Texture Mappig, Part One", www.gamasutra.com, Nov. 10, 2000.
John Schlag, Fast Embossing Effects on Raster Image Data, Graphics Gems IV, Edited by Paul S. Heckbert, Computer Science Department, Carnegie Mellon University, Academic Press, Inc., 1994,pp. 433–437.
James F. Blinn, "Simulationof Wrinkled Surfaces," Caltech/JPL, pp. 286–292, SIGGRAPH 78 (1978).
Tomas Möller and Eric Haines "Real–Time Rendering", AK Peters Ltd., © 1999, pp. 127–142.
Technical Presentation: Vertex Buffers, posted Jun. 12, 2000, www.nvidia.com.
Technical Presentation: Hardware Transform and Lighting, www.nvidia.com, posted Jun. 12, 2000.
Technical Presentation: Hardware Bump–mapping Choices and Concepts, Jun. 7, 2000, www.nvidia.com.
Technical Presentation: How to Bump Map a Skinned Polygonal Model, Jun. 7, 2000, nvidia.com.
Technical Presentation: Computations for Hardware Lighting and Shading, Mar. 17, 2000, www.nvidia.com.
Technical Presentation: Practical Bump–mapping for Today's GPUs, Mar. 17, 2000 www.nvidia.com.
Technical Presentation: Shadows, Transparency, & Fog, Mar. 17, 2000 www.nvidia.com.
Technical Presentation: GeForce 256 Register Combiners, Mar. 17, 2000, www.nvidia.com.
Technical Presentation: TexGen & The Texture Matrix, Mar. 15, 2000 www.nvidia.com.
Technical Presentation: Toon Shading, Mar. 15, 2000, www.nvidia.com.
Technical Presentation: D3D 7 Vertex Lighting, Mar. 15, 2000, www.nvidia.com.
Technical Presentation: Per–Pixel Lighting (by S. Dietrich) Mar. 14, 2000 www.nvidia.com.
Technical Presentation: GeForce 256 and RIVA TNT Combiners, Dec. 8, 1999, www.nvidia.com.

Technical Presentation: Vertex Cache Optimization, Nov. 12, 1999, www.nvidia.com.
Technical Presentation: Vertex Blending, Nov. 12, 1999, www.nvidia.com.
Technical Presentation: Hardware Transform and Lighting, Nov. 12, 1999, www.nvidia.com.
Technical Presentation: GeForce 256 Overview, Nov. 12, 1999, www.nvidia.com.
Technical Presentation: DirectX 7 and Texture Management, Nov. 12, 1999 www.nvidia.com.
Technical Presentation: DotProduct Lighting, Nov. 12, 1999, www.nvidia.com.
Technical Presentation: Texture Coordinate Generation, Nov. 3, 1999, www.nvidia.com.
Technical Presentation: Phong Shading and Lightmaps, Nov. 3, 1999, www.nvidia.com.
Technical Presentation: The ARB_multitexture Extension, Nov. 3, 1999 www.nvidia.com.
Technical Presentation: Multitexture Combiners, Nov. 3, 1999, www.nvidia.com.
Technical Presentation: Emboss Bump Mapping, Nov. 3, 1999, www.nvidia.com.
Technical Presentation: Hardware Accelerated Anistropic Lighting, Nov. 3, 1999 www.nvidia.com.
Technical Presentation: Guard Band Clipping, Nov. 3, 1999, www.nvidia.com.
The RenderMan Interface, Stephan R. Keith, Version 3.1, Pixar Animation Studios, Sep. 1989.
The RenderMan Interface, Version 3.2, Pixar Animation Studios, Jul. 2000, www.pixar.com.
NVIDIA Product Overview, "GeForce2Ultra", NVIDIA Corporation, Aug. 21, 2000, www.nvidia.com.
Duke, "Dreamcast Technical Specs", Sega Dreamcast Review, Sega, 2/99, www.game–revolution.com.
Marlin Rowley, "GeForce 1 & 2 GPU Speed Tests", May 11, 2000, www.g256.com.
"Dreamcast: The Full Story", Next Generation, Sep. 1998.
DirectX 7.0 Programmer's Reference, Microsoft Corporation, 1995–1999 (as part of the DirectX 7.0 SDK on the Companion CD included with "Inside Direct3D", Microsoft Programming Series, Peter J. Kovach, Microsoft Press, 1999).
"Inside Direct3D", Microsoft Programming Series, Peter J. Kovach, Microsoft Press, 1999.
"OpenGL Programming Guide, The Official Guide to Learning OpenGL, Release 1", Jackie Nieder, Tom David, Mason Woo, Addison–Wesley Publishing Co., 1993.
"Procedural Elements for Computer Graphics," Second Edition, David F. Rogers, McGraw Hill, 1998.
"Real–Time Rendering," Tomas Molleir, Eric Haines, AK Peters, 1999.
"Computer Graphics, Principles and Practice," Second Edition, The Systems Programming Series, Foley, van Dam, Fiener, Hughes, Addison Wesley, 1990.
"Principles of Three–Dimensional Computer Animation", Revised Edition, Michael O'Rourke, W.W. Norton & Company, 1998.

* cited by examiner

Fig. 5 EXAMPLE GRAPHICS PROCESSOR FLOW

Example Graphics Pipeline Synchronization Routine Using Token

GRAPHICS PIPELINE TOKEN SYNCHRONIZATION

This application claims the benefit of U.S. Provisional Application No. 60/226,889, filed Aug. 23, 2000, the entire content of which is hereby incorporated by reference in this application.

FIELD OF THE INVENTION

The present invention relates to computer graphics, and more particularly to interactive graphics systems such as home video game platforms. Still more particularly this invention relates to synchronization between a graphics pipeline and a graphics command producer using variable content synchronization tokens.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

A problem graphics system designers confronted in the past was how to synchronize the graphics pipeline with external components such as the graphics command producer. A typical graphics rendering system consists of several asynchronous components (e.g., graphics command producer that generates graphics commands; the graphics processor consuming the commands and producing frame buffer outputs; and a display interface that displays the frame buffers). It is often desirable to synchronize these different stages of the rendering system to establish time-coherence between various operations. For example, it would be very useful for the graphics command producer to know under certain circumstances when the graphics processor has finished processing a given graphics command. The synchronization problem is complicated in that a typical graphics processor may take different amounts of time to process different graphics commands.

Various solutions to this problem were offered. For example, one technique that has been used in the past to provide synchronization between a graphics pipeline and a graphics command producer is to have the graphics pipeline send an interrupt to the command producer when all of the commands in a graphics display list have been processed. While this synchronization capability is very useful, it does not solve more intermediate synchronization requirements within a graphics display list (e.g., to enable the graphics command producer or other actor to perform some task other than sending new graphics commands while the graphics pipeline continues to work on the remainder of a display list).

It is known to insert variable content token identifiers into a graphics command stream to allow a graphics processor to pick between different items for processing. However, such token identifiers were not generally for synchronization purposes but were used instead to allow the graphics pipeline to identify data structures or other items it was to operate upon.

While significant work has been done in the past, further improvements are desirable.

The present invention solves the synchronization problem by providing techniques and arrangements that synchronize a graphics pipeline with an external actor such as, for example, a graphics command producer. In accordance with one aspect provided by this invention, a token including a variable data message is inserted into a graphics command stream sent to a graphics pipeline. At a predetermined point in the pipeline, the token is captured and a signal is generated indicating a token has arrived. An external device can look at the captured token to determine which of multiple possible tokens has been captured.

In one particular example, the graphics pipeline generates an interrupt when a token arrives at a predetermined point in the pipeline, and the other actor can poll a token register to determine the value of the captured token. The graphics command producer or other actor can use the token synchronization information to synchronize a task with the graphics pipeline, e.g., to maintain memory coherence in memory shared between the graphics pipeline and the graphics command producer. In accordance with another aspect of the invention, the graphics command producer can insert multiple tokens of different values in the same graphics command stream, and use a comparison to determine which token has arrived at the predetermined point in the graphics pipeline. Different tasks can be triggered based on which token has arrived at that point.

In accordance with one aspect provided by the invention, a method of synchronizing with a graphics pipeline comprises sending a variable content synchronization token down the graphics pipeline, and detecting when the token has reached a predetermined point in the pipeline. The token may comprise a variable content data message which, in one embodiment, the graphics pipeline does not modify. The detecting step may comprise comparing a value returned by a token register with a value of the sent token. The detecting step may include polling a token register in response to an interrupt.

In accordance with another aspect provided by this invention, a method of synchronizing with a graphics pipeline of the type including a command processor, a transformation unit, a lighting unit, a texture coordinate generator, a texture mapper, a rasterizer, a blender, a pixel engine and a frame buffer includes inserting a variable content data message into the graphics pipeline; capturing the variable content data message at a predetermined position within the pipeline; signaling when the variable content data message has reached the predetermined within the pipeline; and determining whether the captured variable content data message corresponds to the inserted variable content data message. A signaling step may comprise generating an interrupt when the variable content data message reaches the bottom of the pipeline. The capturing step may comprise storing the variable content data message in a register, and the determining step may comprise reading the contents of that register.

In accordance with still another aspect provided by this invention, a command processor receives a variable content data message and passes the variable content data message through a pipeline to a pixel engine. The pixel engine includes a register that captures the variable content data message and signals when the variable content data message has reached the pixel engine.

A still additional aspect provided by this invention provides a token comprising a variable content data message being inserted into a stream of graphics commands. A graphics system provides a response to an inquiry as to whether the portions of the graphics stream before the token have been processed to allow synchronization of graphics system events.

BRIEF DESCRIPTION OF THE DRAWINGS

These and other features and advantages provided by the invention will be better and more completely understood by referring to the following detailed description of presently preferred embodiments in conjunction with the drawings, of which.

DETAILED DESCRIPTION OF EXAMPLE EMBODIMENTS OF THE INVENTION

Figure 1:
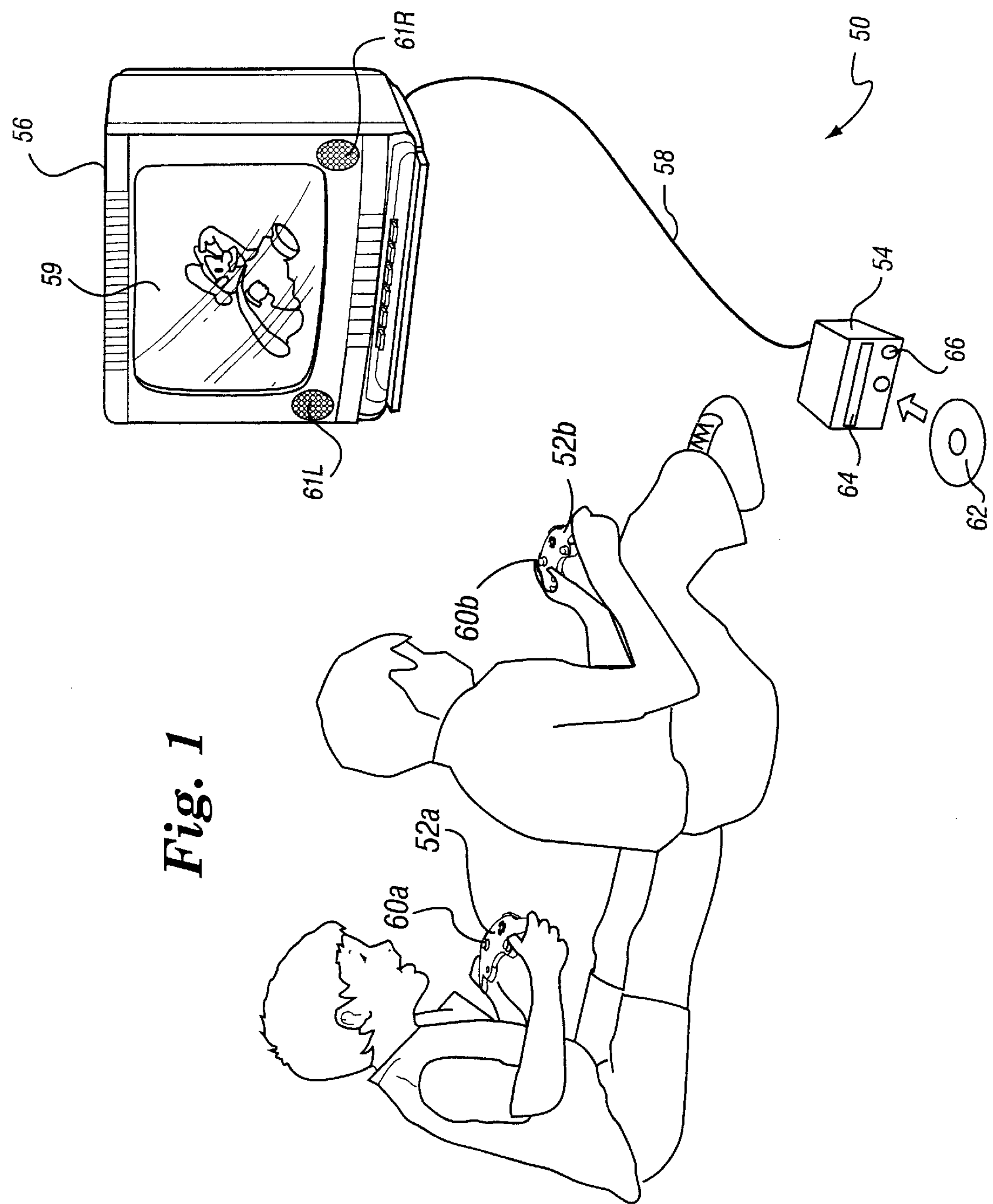
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 59*a*, 52*b* or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52*a*, 52*b* to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
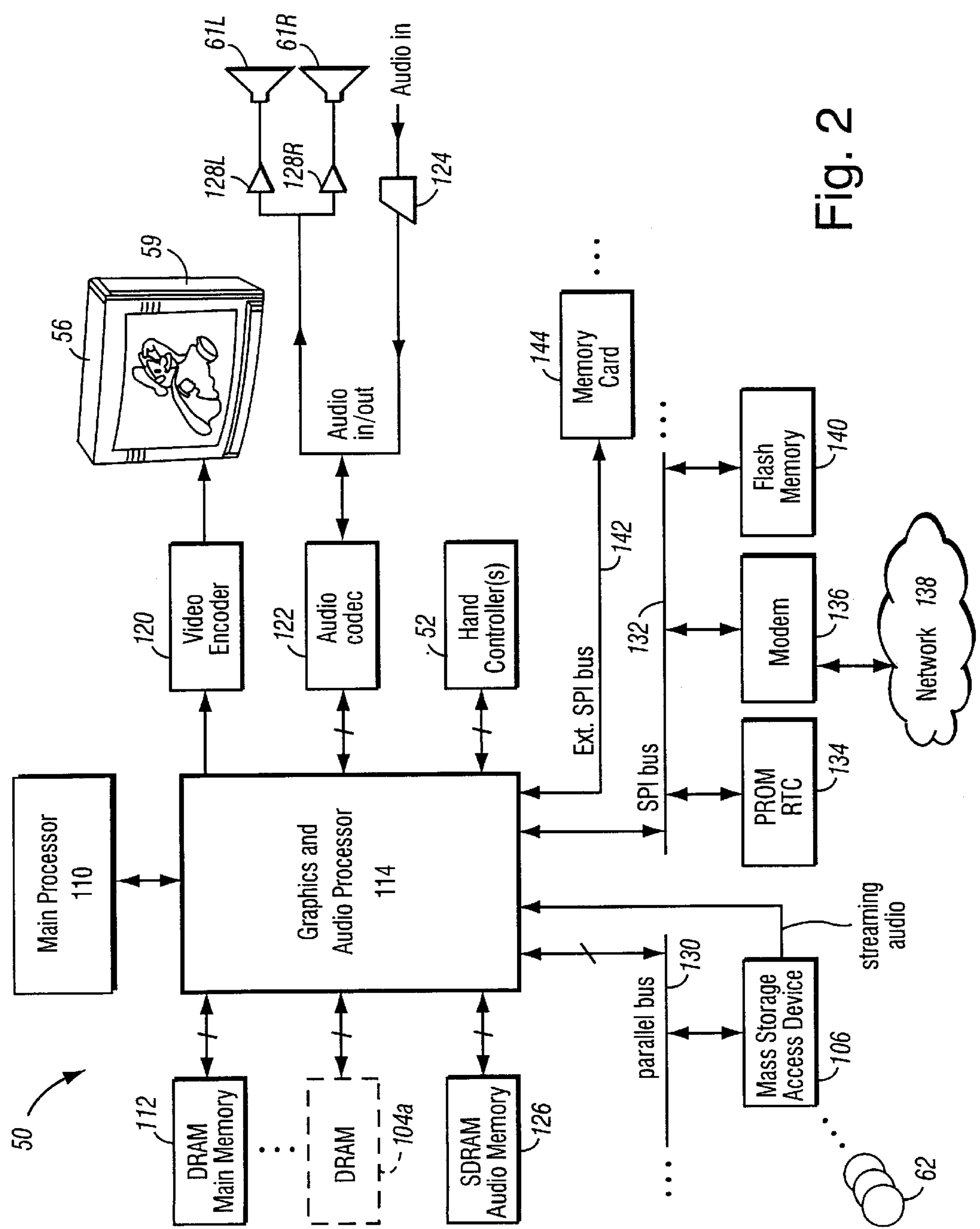
FIG. 2 is a block diagram of the FIG. 1 example computer graphics system.

FIG. 2 shows a block diagram of example components of system 50. The primary components include:

- a main processor (CPU) 110,
- a main memory 112, and
- a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

- a programmable read-only memory and/or real time clock 134,
- a modem 136 or other networking interface (which may in turn connect system 50 to a telecommunications network 138 such as the Internet or other digital network from/to which program instructions and/or data can be downloaded or uploaded), and
- flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
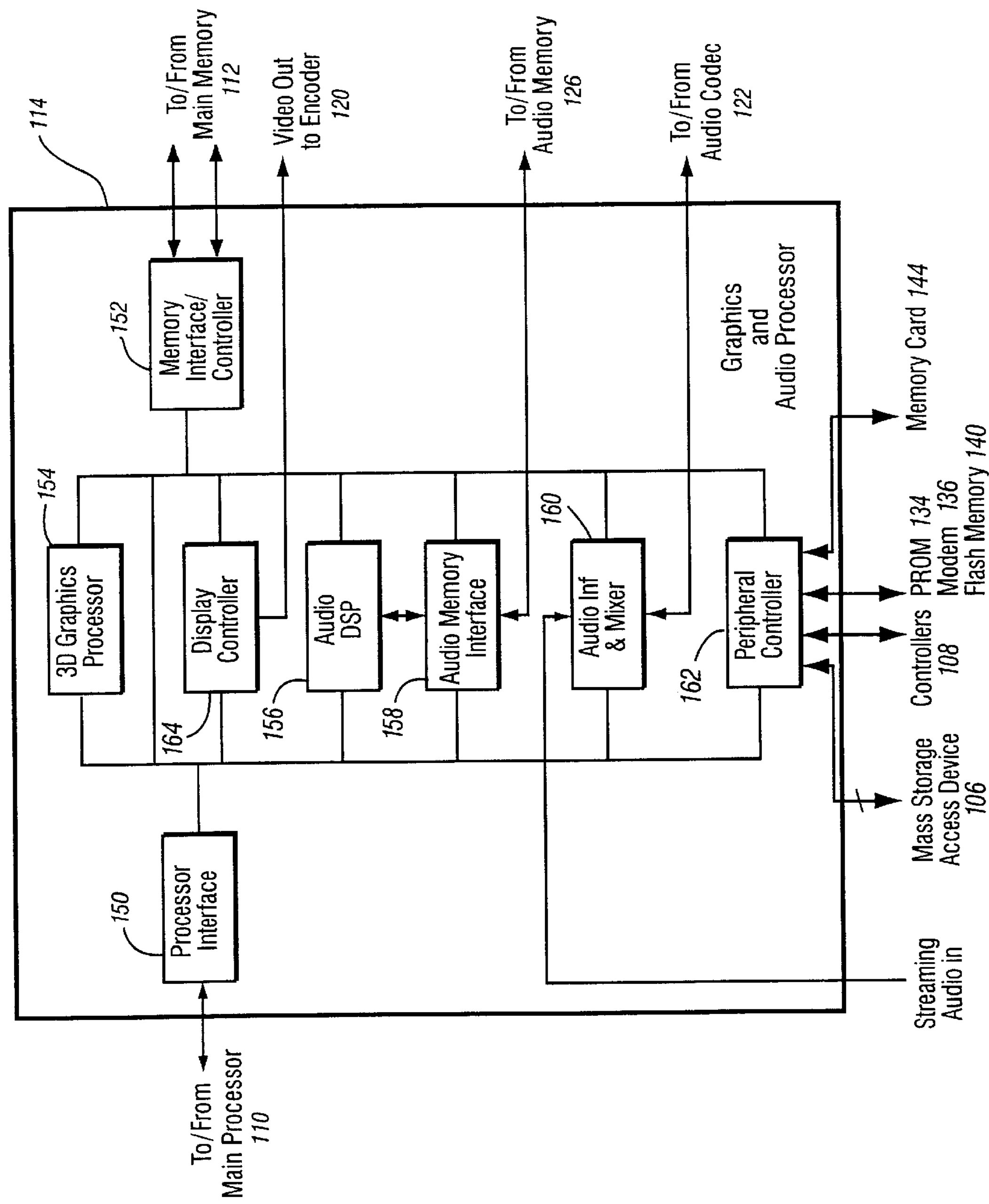
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

- a processor interface 150,
- a memory interface/controller 152,
- a 3D graphics processor 154,
- an audio digital signal processor (DSP) 156,
- an audio memory interface 158,
- an audio interface and mixer 160,
- a peripheral controller 162, and
- a display controller 164.

3D graphics processor 154 performs graphics processing tasks. Audio digital signal processor 156 performs audio processing tasks. Display controller 164 accesses image information from main memory 1 12 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
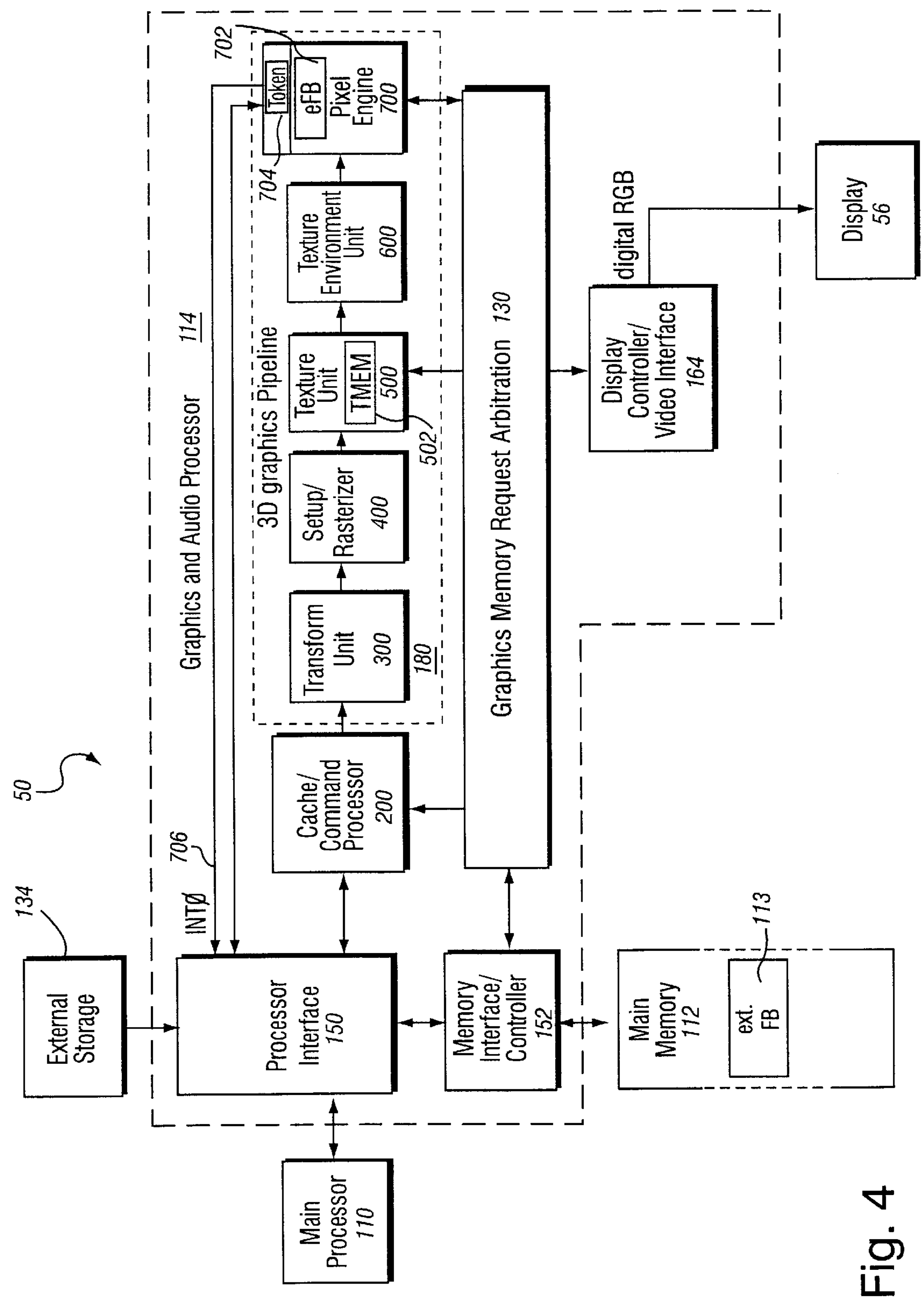
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

Figure 5:
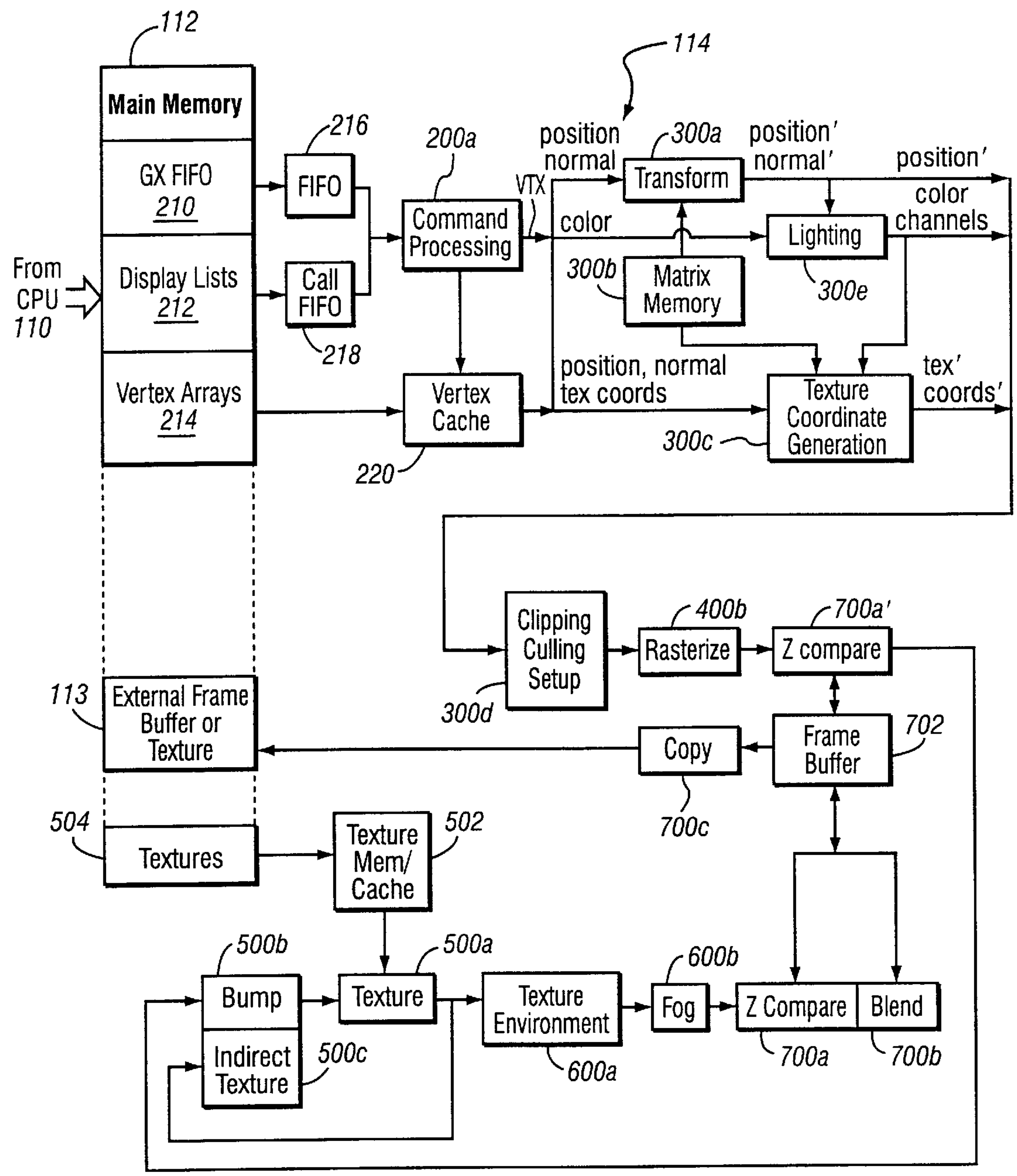
FIG. 5 is an example logical flow diagram of the FIG. 4 graphics and audio processor.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 10. The command processor 200 fetches:

- command streams from main memory 112 via an on-chip FIFO memory buffer 216 that receives and buffers the graphics commands for synchronization/flow control and load balancing,
- display lists 212 from main memory 112 via an on-chip call FIFO memory buffer 218, and
- vertex attributes from the command stream and/or from vertex arrays 214 in main memory 112 via a vertex cache 220.

Command processor 200 performs command processing operations 200*a* that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

- a transform unit 300,
- a setup/rasterizer 400,
- a texture unit 500,
- a texture environment unit 600, and
- a pixel engine 700.

Transform unit 300 performs a variety of 2D and 3D transform and other operations 300*a* (see FIG. 5). Transform unit 300 may include one or more matrix memories 300*b* for storing matrices used in transformation processing 300*a*. Transform unit 300 transforms incoming geometry per vertex from object space to screen space; and transforms incoming texture coordinates and computes projective texture coordinates (300*c*). Transform unit 300 may also perform polygon clipping/culling 300*d*. Lighting processing 300*e* also performed by transform unit 300*b* provides per vertex lighting computations for up to eight independent lights in one example embodiment. Transform unit 300 can also perform texture coordinate generation (300*c*) for embossed type bump mapping effects, as well as polygon clipping/culling operations (300*d*).

Setup/rasterizer 400 includes a setup unit which receives vertex data from transform unit 300 and sends triangle setup information to one or more rasterizer units (400*b*) performing edge rasterization, texture coordinate rasterization and color rasterization.

Texture unit 500 (which may include an on-chip texture memory (TMEM) 502) performs various tasks related to texturing including for example:

- retrieving textures 504 from main memory 112,
- texture processing (500*a*) including, for example, multi-texture handling, post-cache texture decompression, texture filtering, embossing, shadows and lighting through the use of projective textures, and BLIT with alpha transparency and depth,
- bump map processing for computing texture coordinate displacements for bump mapping, pseudo texture and texture tiling effects (500*b*), and
- indirect texture processing (500*c*).

Texture unit 500 outputs filtered texture values to the texture environment unit 600 for texture environment processing (600*a*). Texture environment unit 600 blends polygon and texture color/alpha/depth, and can also perform texture fog processing (600*b*) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700*a*) and pixel blending (700*b*). In this example, pixel engine 700 stores data into an embedded (on-chip) frame buffer memory 702. Graphics pipeline 180 may include one or more embedded DRAM memories 702 to store frame buffer and/or texture information locally. Z compares 700*a* can also be performed at an earlier stage in the graphics pipeline 180 depending on the rendering mode currently in effect (e.g., z compares can be performed earlier if alpha blending is not required). The pixel engine 700 includes a copy operation 700*c* that periodically writes on-chip frame buffer 702 to main memory 112 for access by display/video interface unit 164. This copy operation 700*c* can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Graphics Pipeline Synchronization Mechanism

As shown in FIG. 4, the rendering pipeline of system 50 consists of several asynchronous components. Among them are the main processor 110 generating graphics commands, the graphics and audio processor 114 consuming the commands and producing frame buffers, and the display controller/video interface 164 displaying the frame buffers. The present invention provides a mechanism to synchronize these components—allowing for various programming models with different levels of complexity.

In the example embodiment, main processor 110 should be coordinated with the graphics and audio processor 114. For example, primitive data and texture data that the main processor 110 provides should remain available until the graphics and audio processor 114 has read it, after which the main processor can alter the data for the next frame or delete it as necessary. Also, the graphics and audio processor 114 should be coordinated with the display controller/video interface 164 such that the embedded frame buffer 702 is only copied to an inactive external frame buffer 113, and the display controller/video interface 164 will switch to scanning out the new external frame buffer at the right time—freeing up the previously scanned-out external frame buffer for use by the next frame. Other applications for synchronization include other memory coherence tasks for portions of main memory 112 shared between the main processor 110 and the graphics and audio processor 114.

One mechanism the example embodiment provides for synchronization is a so-called "draw done" command. In this particular example, the "draw done" command is a wrapper around two synchronization functions in the preferred embodiment: a "set draw done" and a "wait draw done." The "set draw done" command sends a draw-done token into a first in first out buffer between the main processor 110 and the graphics and audio processor 114 and flushes that buffer. The "wait draw done" command waits for the graphics pipeline 180 to flush and the token to appear at the bottom of the graphics pipeline. Instead of waiting for the token, one can also make use of a callback that happens as a result of a draw-done interrupt. This callback runs with interrupt disabled, and thus completes quickly. The function to set the callback routine may also return the previous callback function pointer.

In addition to the "draw done" synchronization mechanism described above, the preferred embodiment of system 50 also includes a "draw sync" command used to detect that the graphics pipeline 180 has completed processing of certain commands (e.g., completely rendered certain geometry). Using this "draw sync" mechanism, the programmer can send a variable content token, e.g., a 16-bit number of the main processor 110's choosing, down the graphics pipeline 180. This token is stored in a token register 704 once it reaches a predetermined point in the graphics pipeline—in this particular example, the very bottom of the graphics pipeline within the pixel engine 700. Main processor 110 can read token register 704 by sending an additional command to the graphics and audio processor 114. When the token register value returned matches the token the main processor 110 has sent, the main processor knows that the particular geometry associated with the token has been completely rendered.

In more detail, the graphics and audio processor may include the following commands in its repertoire of synchronization commands:

GXSetDrawSync (Token); and

GXReadDrawSync (Token).

In these examples, the argument "Token" is a 16-bit unsigned integer value. In response to the GXSetDrawSync command, the graphics pipeline 180 hardware writes Token into token register 704 when this command reaches the bottom of the drawing pipeline. The register 704 can be read back (e.g., polled) to check the progress of drawing. In the preferred embodiment, the GXDrawSync thus allows one to insert a number (16-bit token) into the graphics pipeline 180 and read the token value when it reaches the bottom of the graphics pipeline, without forcing the graphics pipeline to be flushed (and without creating a "bubble" of idle cycles within the graphics pipeline). The GXReadDrawSync command reads the token register 704 at the bottom of the graphics pipeline 180, and returns the token value.

In a particular example implementation, an interrupt line 706 is provided from pixel engine 700 to processor interface 150. This interrupt line 706 is associated with the token register 704 and associated function. Pixel engine 700 asserts this interrupt line 706 as active (e.g., high) when the token register 704 within pixel engine 700 has received and stored a token in response to the "GXSetDrawSync" command described above. This interrupt function can be enabled or disabled by main processor 10 by writing an interrupt enable value to a further interrupt control register (not shown) within pixel engine 700. Main processor 110 can clear the interrupt once asserted by writing to the interrupt control register within the pixel engine 700, and can poll the contents of token register 700 by sending the "ReadDrawSync" command described above.

In the preferred embodiment, an application running on main processor 110 can register a token interrupt callback asserting a "GXDrawSyncCallback" command. The callback's argument is the value of the most recently encountered token. Since it is possible to miss tokens (graphics processing does not stop while the callback is running), the application should be capable of deducing if any tokens have been missed (e.g., by using monotonically increasing values).

Figure 6:
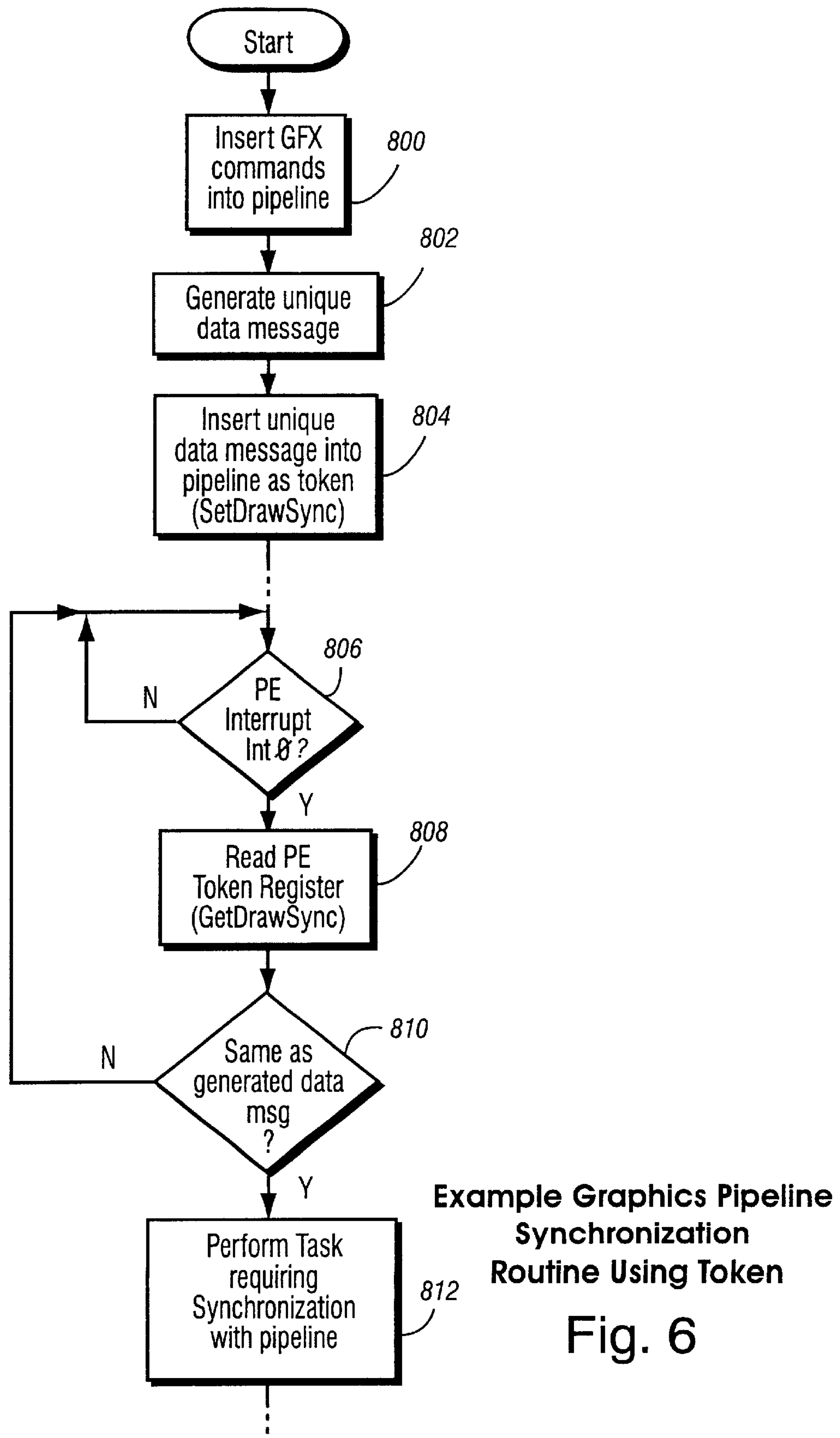
FIG. 6 is flowchart of example graphics pipeline synchronization using a synchronization token.

FIG. 6 shows an example flowchart using the token synchronization mechanism described above. The FIG. 6 flowchart might, for example, be performed by an application running on main processor 110. In this particular example, the application inserts one or more graphics commands into the graphics pipeline 180 (block 800), and generates a unique data message (block 802) and inserts that unique data message into the graphics pipeline as a token using the SetDrawSync command described above (block 804). In this particular example, the inserted token is a unique structured data object or message that comprises a non-reducible textual element in the data that is being parsed—for example, a variable name, a value, a number, a character or a word. The application may then perform other tasks while waiting for an interrupt from pixel engine 700 (block 806). Once the interrupt is received, the application may read pixel engine token register 704 using the GetDrawSync command discussed (block 808). When the application retrieves the contents of token register 704 it may compare that value with a particular value it sent as a token to determine whether the value matches (decision block 810). If the comparison is favorable, then the application may perform a task (block 812) requiring synchronization with the graphics pipeline 180—since the application "knows" that the graphics pipeline 180 has finished processing command(s) inserted prior to the token by block 800.

The following is an example usage:

```
void GXSetDrawSync(u16 token);
u16 GXReadDrawSync( );
typedef void (*GXDrawSyncCallback)(u16 token);
GXDrawSyncCallback GXSetDrawSyncCallback
(GXDrawSyncCallback cb);
```

The synchronization token described above permits applications running on main processor 110 to define any number of different synchronization events, and distinguish between those synchronization events based on token value. In the preferred embodiment, the graphics pipeline 180 does not modify the token value so that the main processor 110 can easily recognize it—but in other embodiments, the graphics pipeline 180 could perform a predetermined function on the token value to change its value without destroying the ability of the main processor 110 to correlate tokens it inserts into the graphics pipeline 180 with token values received at the pixel engine 700. In the preferred embodiment, the token register 704 is disposed at the very bottom of the graphics pipeline 180, but it could be disposed at other places—or multiple token registers and associated interrupt lines could be provided if desired to monitor geometry completion states other than final completion. One useful application of this synchronization mechanism is when main processor 110 writes to memory separate from the graphics pipeline 180 (e.g., a main memory 112 that is shared between the main processor 110 and the graphics pipeline 180) and wants to maintain memory coherence.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 7A:
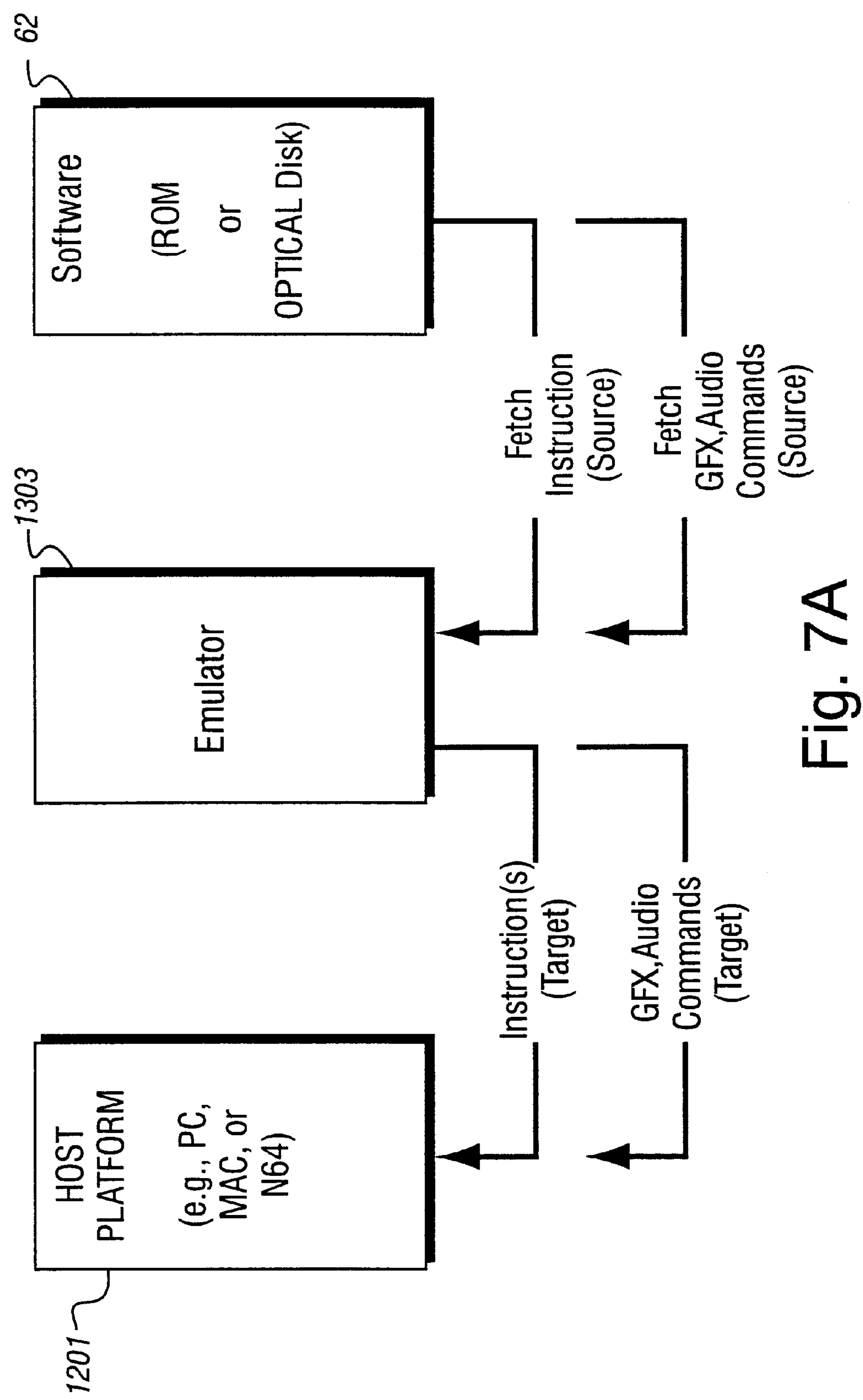
FIGS. 7A and 7B show example alternative compatible implementations.

FIG. 7A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 1305 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 7B:
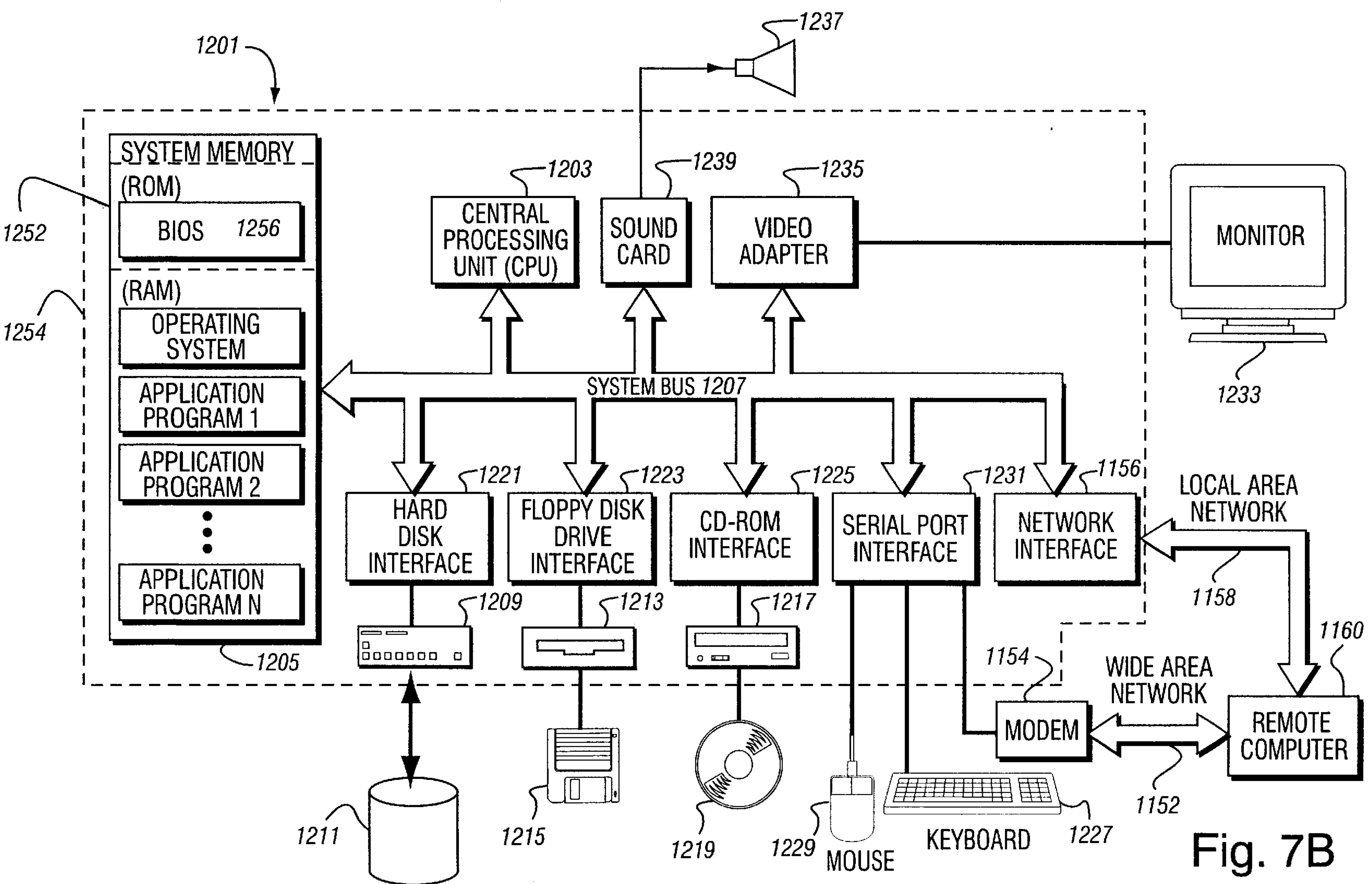

FIG. 7B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referenced above are hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A method of synchronizing at least one process external to a graphics pipeline with the graphics pipeline comprising:

sending a programmable content synchronization token down the graphics pipeline;

detecting when the synchronization token has reached a predetermined point in the pipeline; and signaling the external process when the synchronization token has been detected to reach said predetermined point in the pipeline.

2. The method of claim 1 wherein the synchronization token comprises a variable content data message the graphics pipeline does not modify.

3. The method of claim 1 wherein the detecting step comprises comparing a value returned by a token register with the value of the sent synchronization token.

4. The method of claim 1 further including specifying, with an application program, a variable synchronization token value to send down the graphics pipeline.

5. The method of claim 1 wherein the synchronization token comprises a 16-bit variable value.

6. The method of claim 1 wherein the detecting step includes polling a synchronization token register at the end of the pipeline in response to an interrupt.

7. A method of synchronizing at least one process external to a graphics pipeline with the graphics pipeline, said graphics pipeline being of the type including a command processor, a transformation unit, a lighting unit, a texture coordinate generator, a texture mapper, a rasterizer, a blender, a pixel engine and a frame buffer, the method comprising:

inserting a variable content synchronization message into the graphics pipeline;

capturing the variable content synchronization message at a predetermined position within the pipeline;

signaling the external process when the variable content synchronization message has reached the predetermined position within the pipeline; and testing whether the captured variable content synchronization message corresponds to the inserted variable content synchronization message.

8. The method of claim 7 wherein the signaling step comprises generating an interrupt when the variable content synchronization message reaches the bottom of the pipeline.

9. The method of claim 7 wherein the capturing step comprises storing the variable content synchronization message in a register, and the determining step includes reading the contents of the register.

10. The method of claim 7 wherein the pixel engine performs the signaling step.

11. The method of claim 7 wherein the graphics pipeline does not modify the variable content synchronization message.

12. A graphics pipeline including:

a command processor, a transformation unit, a lighting unit, a texture coordinate generator, a texture mapper, a rasterizer, a blender, a pixel engine, and a frame buffer, wherein the command processor receives a variable content synchronization message and passes the variable content synchronization message through the graphics pipeline to the pixel engine, the pixel engine including a register that captures the variable content synchronization message and signals at least one process external to the graphics pipeline when the variable content synchronization message has reached the pixel engine.

13. The graphics pipeline of claim 12 wherein the graphics pipeline does not alter the variable content synchronization message.

14. A graphics system of the type that receives a stream of graphics commands and generates an image based on the graphics command stream, the graphics system being adapted to receive, within the stream of graphics commands, a synchronization token comprising a variable content synchronization message, the graphics system providing a response to an inquiry as to whether portions of the graphics stream earlier in a graphics command sequence with respect to the synchronization token have been processed to allow synchronization of graphics system events with at least one process external to the graphics command stream processing.

15. The graphics system as in claim 14 wherein the graphics system includes an application specific integrated circuit.

16. The graphics system as in claim 14 wherein the graphics system includes a 3D graphics pipeline.

17. A method of synchronizing a process external to a 3D graphics pipeline with the 3D graphics pipeline, the 3D graphics pipeline being of the type including command processing, transformation, lighting, texture coordinate generation, texture mapping, rasterizing, and blending, an improvement comprising:

inserting a variable content synchronizing token into the graphics pipeline; and signaling the external process upon the token reaching a predetermined point in the graphics pipeline.

* * * * *